Dec. 6, 1955 R. M. REICHL 2,725,743
PIPE TESTING MACHINE
Filed June 22, 1950 2 Sheets-Sheet 1
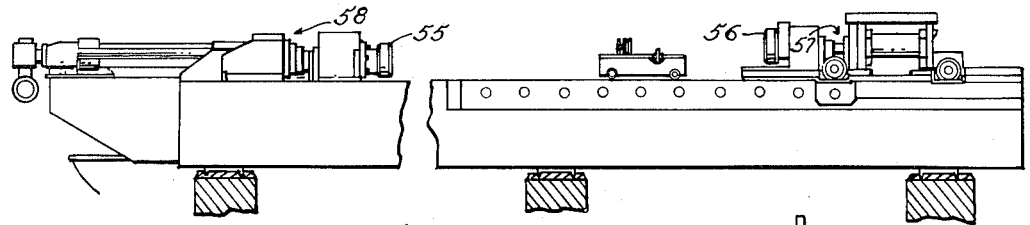
Fig.4.
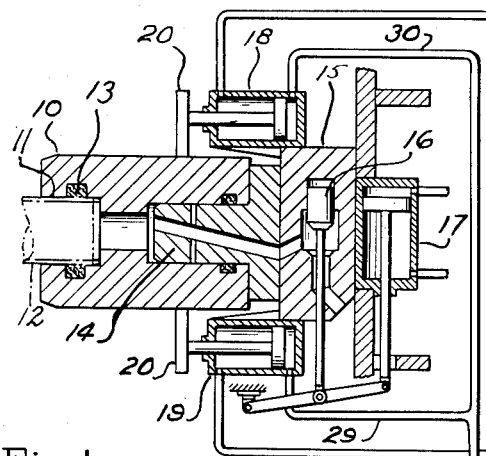
Fig.1
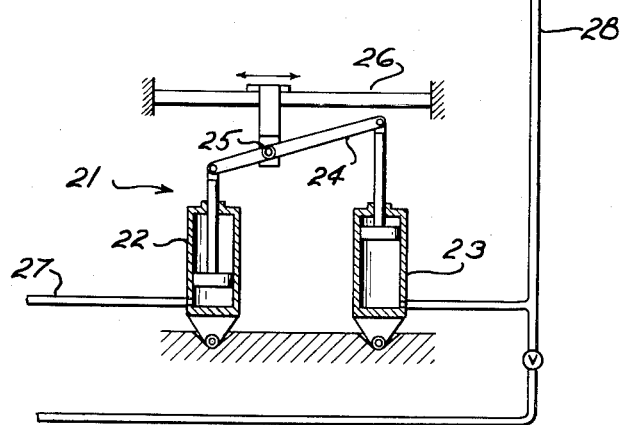
INVENTOR.
REYMOND. M. REICHL
BY
Pollard & Johnston
ATTORNEYS Dec. 6, 1955
R. M. REICHL
2,725,743
PIPE TESTING MACHINE
Filed June 22, 1950
2 Sheets-Sheet 2
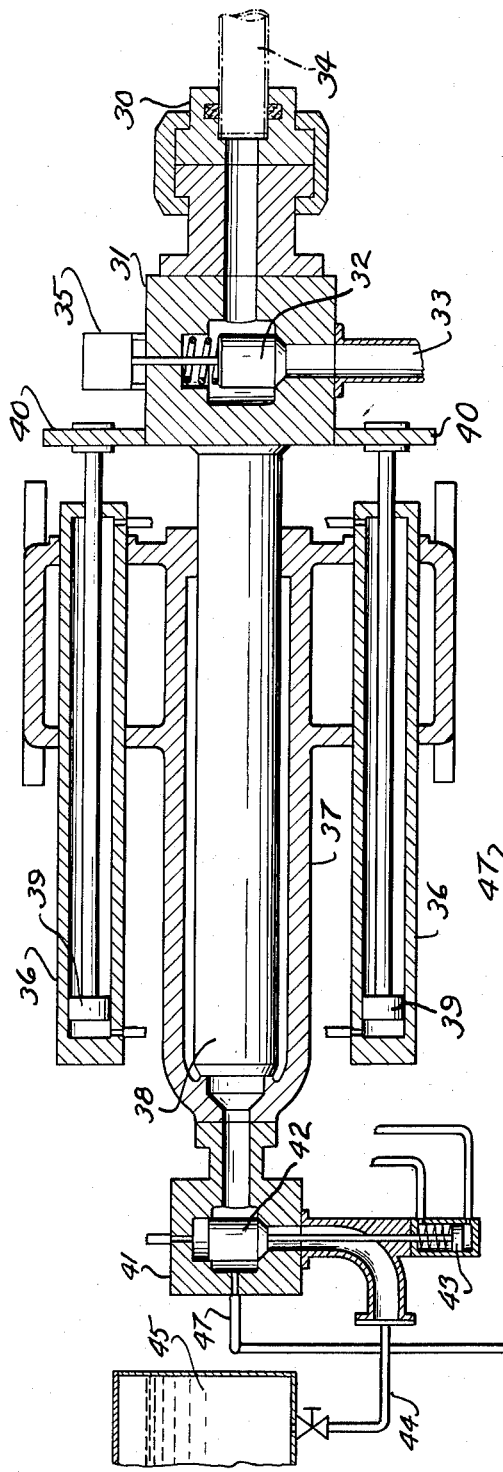
Fig.2
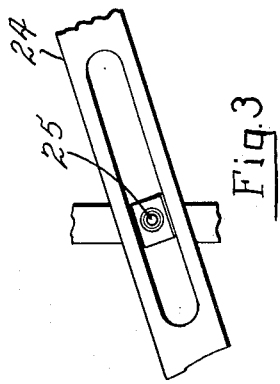
Fig.3
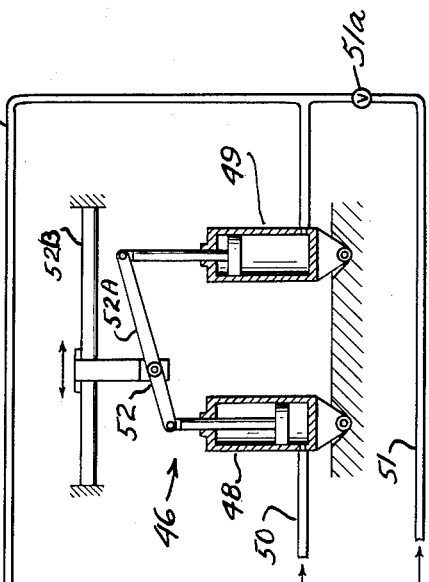
INVENTOR.
REYMOND M. REICHL
BY
Pollard & Johnston
ATTORNEYS

United States Patent Office 2,725,743
Patented Dec. 6, 1955

2,725,743

PIPE TESTING MACHINE

Reymond M. Reichl, Forest Hills, N. Y., assignor to Hydropress, Incorporated, New York, N. Y., a corporation of Delaware Application June 22, 1950, Serial No. 169,757

4 Claims. (Cl. 73—49.6)

This invention relates to a machine wherein a pipe, tube, or the like, has fluid pressure applied thereto, while the ends are held in sealed relationship relative to said machine, and is especially concerned with a mechanism compensating for changes in length of a tube held relative to sealing elements engaging the ends thereof.

In previous testing devices, various arrangements have been provided for holding pipes or tubes between sealing heads. The pipe is positioned in alignment with the sealing heads and then the heads are moved inwardly relative to each other so as to engage the ends of the pipe and to seal the same. Fluid testing pressure then is applied to the interior of the tube so as to test the mechanical strength thereof or fluid tightness. Fluid pressure also can be used to expand the tube so as to increase the size thereof or to otherwise form the same.

In one form of the invention, one of the sealing heads may be mounted on a hydraulic ram means carried on a stationary housing, and the other sealing head can be mounted on a shiftable carriage.

When sealing heads are used wherein the ends of the pipe are held against a plate-like sealing means, a longitudinally directed sealing force, much larger than the hydraulic force created by the internal fluid pressure, must be used. As a result thereof, high buckling stresses will be set up in the pipe.

Outside sealing heads also can be used in place of end sealing heads, in such a case, the pipe ends being slidable in apertures or cavities in the sealing heads. In addition, inside sealing means also can be used wherein the sealing elements are slid into the end portions of the pipe. Use of outside and inside sealing methods serves to minimize the previous difficulties, but another problem exists because of the relative movement of the sealing heads and their packings with their pipe ends. In addition, there is a tendency for the test head to move backwards because of elongation of the machine frame due to the high pressures used. When the packings in the sealing heads slide under high pressure over rough surfaces of the pipe or element being tested, the packings rapidly become destroyed, so that the machine frequently must be shut down for change of the packings.

One of the objects of the invention is to provide an improved means for compensating for pressure effects on the pipe and to correlate this with the fluid testing pressures.

Another object of the invention is to provide a readily adjustable compensating mechanism.

Still a further object of the invention is to provide a hydraulic compensating mechanism using a minimum compensating pressure.

In one aspect of the invention, a sealing head at the tail stock end of the machine is mounted on a compensating or stationary plunger and compensating cylinder means is connected to the sealing head to provide relative motion between the plunger and head. Preferably, a pressure intensifier or changer is connected to the compensating cylinders in such a way that the pressure exerted on the intensifier is changed to the desired pressure required for operating the compensating mechanism. One side or the inlet side of the intensifier can be connected to the source of fluid testing pressure and thus the intensifier will closely follow the pressure build-up or changes therein. The inlet or motivating pressure side also can be connected to the main testing fluid intensifier.

In a further aspect, it is possible to mount the compensating means on the head stock or stationary housing portion of the testing machine, such an arrangement eliminating flexible connections to the hydraulic mechanism. Lateral fast advance and pull-back rams or fluid motors can be used to move the main ram and sealing test head, the output of the intensifier or changer arrangement being connected to the main ram and the input of the intensifier connected to the testing fluid. The lateral fluid motors advance the sealing head into engagement with the pipe, and as test pressure fluid is fed to the pipe, the intensifier will apply the correct pressure to the main ram so as to provide the desired follow-up.

In a preferred form of the invention, the pressure changer or the intensifier may comprise a pair of cylinders joined by an arm having an adjustable pivot or fulcrum for the purpose of varying the relation of the movement or stroke of the pistons to each other. The intensifier thus will serve as an adjustable hydraulic "divider."

These and other purposes and advantages of the invention will become evident from the following description which is merely exemplary.

In the drawings:

Figure 1 is a diagrammatic sectional view showing one form of the invention, as applied to the shiftable carriage or tail stock.

Figure 2 is a schematic diagram of another form of the invention as applied to the stationary housing or head stock end of the machine.

Figure 3 is an enlarged fragmentary view of one form of adjustable fulcrum.

Fig. 4 is a schematic elevation showing a testing machine to which the invention can be applied.

The invention first will be described in conjunction with the arrangement at the shiftable carriage end of the machine. For purposes of illustration, the details of the frame of the machine holding the shiftable carriage and the stationary housing are omitted. Reference may be made to Fig. 4 for one arrangement of a testing machine. The pipe to be tested is held in the two sealing heads 55, 56, and in sealing relationship therewith, the shiftable carriage 57 being suitably adjusted in accordance with the length of the pipe to be tested. The stationary housing 58 carries sealing head 55. After the pipe is in sealed relationship with said heads, the filling or testing fluid is admitted to the pipe.

When the invention is applied to the shiftable carriage end of the machine, test head 10 may have an aperture 11 for receiving pipe 12, packing 13 providing a hydraulic seal with the outside of the pipe. Test head 10 is slidably mounted on plunger 14 which is stationary relative to frame 15, said plunger being suitably carried by shiftable carriage frame housing 15 and preferably being slightly less in diameter than the exterior diameter of the pipe where sealed. Filling or release valve 16 is provided therein, said valve being operable by a suitable hydraulic means 17.

Compensating or lateral cylinders 18, 19 are carried by shiftable carriage frame 15 and are connected through brackets or lugs 20 with the test head 10. It is evident that one or more compensating cylinders or motors can be used.

The intensifier or changer 21 comprises an inlet cylinder 22 and an outlet cylinder 23, the plungers thereof being joined by a pivoted lever 24. Pivoted lever 24 has a fulcrum 25 which is adjustable longitudinally of the lever 24 along mechanism 26. As shown in Figure 3, lever 24 may have a slot in which an element slides. Fulcrum 25 may be in the form of a ball bearing. The main testing fluid intensifier can be connected to the inlet cylinder 22 through piping 27. The outlet cylinder 23 can be connected through pipes 28, 29, and 30 with the compensating cylinders 18 and 19, respectively. The position of the fulcrum is adjustable so as to provide the required positive follow-up force at all times and to regulate the same so that the force will be the minimum possible to avoid excessive buckling stresses in the pipe.

The described arrangement is a closed hydraulic system so that during pressure build-up and during maintenance of pressure, any pressure variations because of uneven expansion will be instantaneously reflected in the circuit, so as to modify the follow-up force.

The invention may be used for the head stock or stationary housing end, in which instance the problem of flexible connections with the compensating cylinder is eliminated. Sealing head 30 (Fig. 2) is mounted on valve block 31 having a suitable valve 32 therein controlling the flow of testing fluid from inlet 33 to the pipe 34. A suitable valve operating mechanism 35 can be connected to valve 32 for controlling the flow of pressure fluid into the pipe. Lateral or fast advance and pull-back hydraulic motors 36 can be mounted on the main cylinder 37, main ram 38 being reciprocable in main cylinder 37. Main cylinder 37 can be carried by the stationary housing or frame of the testing machine. Pistons 39 are connected to crosshead 40 for the purpose of moving the sealing head and valve block as desired.

Main ram valve body 41 has valve 42 therein controlled by valve operator 43. The valve 42 is connected through line 44 with the main oil tank or reservoir 45.

Lateral cylinders 36 are connected through lines 46 with a source of control fluid for suitably moving the sealing head and as the pressure fluid is introduced into cylinders 36, the sealing head will be moved forward. At this time, main valve 42 is open so as to allow the flow of oil from tank 45 into main cylinder 37.

The pressure intensifier or changer arrangement 46 is connected through line 47 with main cylinder 37. Inlet or motivating cylinder 48 is connected by line 50 with the source of testing fluid for tube 34. Fluid under pressure is supplied to line 47 by a supply line 51 which is connected with line 47 through a check valve 51a, the latter serving to prevent backward flow in supply line 51 when the intensifier develops an over-pressure. The adjustable fulcrum 52 is adjusted to give the desired over-pressure at the ram for the required follow-up movement thereof. Upon upward movement of the piston in inlet cylinder 48 by application of fluid testing pressure thereto, the piston in outlet cylinder 49 will be moved downwardly so as to cause the desired pressure to be exerted through line 47 on main ram 38. Adjustable fulcrum 52 is arranged to be movable along the lever 52A on guide 52B. Thus, the relative strokes of the two pistons can be varied in accordance with the pressure necessary to cause proper follow-up of the sealing head relative to pipe 34 as the pipe shortens.

During the follow-up movement, the lateral cylinders 36 are inactive. Thus, it is apparent that by proper adjustment of the fulcrum, a pressure will be exerted on main ram 38 proportionate at all times during follow-up to the pressure generated in the pipe under test, the proportion being small, so that a small but adjustable over-pressure is obtained at the test head.

It is to be understood that the details of construction can be changed without departing from the spirit of the invention except as defined in the appended claims.

What is claimed is:

1. In a hydraulic tube testing machine or the like, the combination comprising a pair of housings with sealing members carried thereby, said sealing members having article engaging and sealing portions engaging the wall of a tube to be tested in radial directions, a source of fluid pressure for the tube, a hydraulic compensating means connected between one of said sealing members and the housing carrying the same, said compensating means being operable to displace said sealing portion relative to the housing and to the other sealing member, and a hydraulic intensifier having its pressure outlet connected to said compensating means and its motivating inlet connected to the source of pressure supplying test pressure for the tube, said hydraulic intensifier including means to vary the ratio between the test pressure for the tube and the pressure acting upon the compensating means.

2. In a hydraulic tube testing machine or the like, the combination comprising a pair of housings with sealing members carried thereby, said sealing members having article engaging and sealing portions, a source of fluid test pressure for the tube, a hydraulic compensating means connected to one of said sealing members and to the housing carrying the same, said compensating means being operable to displace said sealing portion relative to its housing and to the other sealing member, a hydraulic intensifier having a pair of cylinders and pistons, mechanism joining said pistons for moving the same, fluid connections between one of said cylinders and said hydraulic compensating means, fluid connections between the other cylinder and the source of fluid test pressure for the tube, and means for changing the ratio of movement of said pistons by said mechanism, so as to adjust the compensating pressure supplied to said hydraulic compensating means.

3. In a hydraulic tube testing machine, the combination comprising a pair of housings with sealing members carried thereby, said sealing members having article engaging and sealing portions, a source of fluid testing pressure for a tube to be tested, a main cylinder and ram carrying one of said sealing members, means moving said ram and sealing member into engagement with the tube, and a hydraulic intensifier having its pressure outlet connected to said main cylinder and its motivating inlet connected to said source of fluid testing pressure, an over-pressure being exerted by said main cylinder ram proportional to said fluid testing pressure to move the sealing member to compensate for changes in tube position relative to the sealing members said hydraulic intensifier including means to vary the proportion between the test pressure for the tube and the pressure acting upon the main cylinder ram.

4. In a hydraulic tube machine, the combination comprising a pair of housings with sealing members carried thereby, said sealing members having article engaging and sealing portions, a source of fluid pressure for the tube, a ram element upon which a sealing member is reciprocably mounted so that said sealing member can move relative to the housing and the other sealing member, hydraulic motors connected to said sealing member, a hydraulic intensifier having a pair of cylinders and pistons, mechanism joining said pistons for moving the same, fluid connections between one of said cylinders and said hydraulic motors, fluid connections between the other cylinder and the source of fluid pressure for the tube, and means for changing the ratio of movement of said pistons by said mechanism, so as to adjust the compensating pressure supplied to said hydraulic motors in accordance with the fluid pressure for the tube.

References Cited in the file of this patent

UNITED STATES PATENTS

| Number | Name | Date |
| --- | --- | --- |
| 1,811,138 | Lassman | June 23, 1931 |
| 1,954,039 | Campbell | Apr. 10, 1934 |
| 2,326,345 | Ernst et al. | Aug. 10, 1943 |
| 2,329,035 | Cross | Sept. 7, 1943 |
| 2,497,193 | Webb | Feb. 14, 1950 |
| 2,522,927 | Camerota | Sept. 19, 1950 |
| 2,578,728 | Musser | Dec. 18, 1951 |
| 2,683,982 | Lassman et al. | July 20, 1954 |
| 2,684,590 | Lassman | July 27, 1954 |

FOREIGN PATENTS

| Number | Country | Date |
| --- | --- | --- |
| 598,479 | France | Dec. 17, 1925 |